(12) United States Patent
Reid et al.

(10) Patent No.: US 10,005,380 B2
(45) Date of Patent: Jun. 26, 2018

(54) MULTI-LINKAGE MARINE SEAT HINGE

(71) Applicant: Protomet Corporation, Oak Ridge, TN (US)

(72) Inventors: William Matthew Reid, Knoxville, TN (US); Michael Shane Garner, Philadelphia, PA (US); Dale Lee Lambert, Oak Ride, TN (US)

( * ) Notice: Subject to any disclaimer, the term of this patent is extended or adjusted under 35 U.S.C. 154(b) by 113 days.

(21) Appl. No.: 15/133,545

(22) Filed: Apr. 20, 2016

(65) Prior Publication Data
US 2017/0305307 A1 Oct. 26, 2017

(51) Int. Cl.
*B60N 2/90* (2018.01)
*B60N 2/44* (2006.01)
*B60N 2/20* (2006.01)
*B63B 29/04* (2006.01)

(52) U.S. Cl.
CPC .............. *B60N 2/919* (2018.02); *B60N 2/20* (2013.01); *B60N 2/442* (2013.01); *B63B 29/04* (2013.01); *B63B 2029/043* (2013.01)

(58) Field of Classification Search
CPC . A47C 1/143; B61D 33/0021; B64D 11/0641
USPC .............. 297/354.13, 354.1, 356, 361.1, 383
See application file for complete search history.

(56) References Cited

U.S. PATENT DOCUMENTS

| | | | |
|---|---|---|---|
| 461,198 A | 10/1891 | Henry | |
| 684,747 A | 10/1901 | Cole | |
| 2,019,266 A * | 10/1935 | Meilves | A47C 17/17 297/354.13 |
| 2,654,099 A * | 10/1953 | Ake | A47C 17/1756 297/354.13 |
| 2,730,164 A * | 1/1956 | Higley | B61D 33/0021 297/321 |
| 3,630,569 A * | 12/1971 | Lory | A61G 15/02 297/354.13 |
| 3,964,785 A | 6/1976 | Plume | |
| 4,218,091 A * | 8/1980 | Webster | B60N 2/231 297/354.13 |
| 4,672,696 A | 6/1987 | Horenkamp | |
| 5,136,963 A | 8/1992 | Zuzik | |
| 5,261,725 A * | 11/1993 | Rudolph | A47C 9/02 297/354.13 |
| 5,320,059 A | 6/1994 | Ikeda | |
| 5,454,624 A * | 10/1995 | Anglade | B60N 2/0292 297/321 |
| 5,718,479 A | 2/1998 | Rautenbach | |
| 5,788,183 A * | 8/1998 | Marechal | B60N 2/34 105/316 |
| 5,790,997 A * | 8/1998 | Ruehl | A47C 17/162 297/316 |

(Continued)

*Primary Examiner* — Jose V Chen
(74) *Attorney, Agent, or Firm* — Matthew M. Googe; Robinson IP Law, PLLC

(57) ABSTRACT

A multi-linkage hinge assembly is provided for pivoting a seat cushion between flat and upright positions. The hinge assembly includes a base bracket, a seat bracket having a support surface, a front linkage member pivotally attached between the seat bracket and base bracket, a rear linkage assembly having a lower linkage member pivotally attached to an upper linkage member, and a tie linkage connecting the front linkage member to the rear linkage assembly. The tie linkage synchronizes movement of the front linkage and rear linkage assembly when the hinge is operated to move between an upright and flat position.

19 Claims, 9 Drawing Sheets

(56) References Cited

U.S. PATENT DOCUMENTS

| | | | |
|---|---|---|---|
| 6,212,713 B1 * | 4/2001 | Kuck | A47C 20/041 |
| | | | 297/354.13 |
| 6,527,341 B1 | 3/2003 | Martin | |
| 6,679,556 B1 * | 1/2004 | Alvestad | A47C 20/08 |
| | | | 297/317 |
| 6,682,146 B2 * | 1/2004 | Minai | B60N 2/06 |
| | | | 297/216.15 |
| 6,688,691 B2 * | 2/2004 | Marechal | A47C 1/0352 |
| | | | 297/317 |
| 6,715,825 B2 | 4/2004 | Tame | |
| 6,883,458 B2 | 4/2005 | Huse | |
| 7,661,382 B2 | 2/2010 | Wood | |
| 8,740,297 B1 | 6/2014 | Foss | |
| 9,016,790 B2 * | 4/2015 | Voyce, IV | A47C 1/035 |
| | | | 297/340 |
| 9,021,975 B1 | 5/2015 | Fodor | |
| 2001/0033101 A1 * | 10/2001 | Plant | A47C 1/0352 |
| | | | 297/342 |
| 2002/0130535 A1 | 9/2002 | Dick | |
| 2007/0158986 A1 | 6/2007 | Adams | |
| 2012/0038196 A1 * | 2/2012 | Lawson | B64D 11/06 |
| | | | 297/354.13 |
| 2012/0074751 A1 * | 3/2012 | De La Garza | B64D 11/06 |
| | | | 297/354.13 |

\* cited by examiner

MULTI-LINKAGE MARINE SEAT HINGE

FIELD

This disclosure relates to the field of seat support assemblies. More particularly, this disclosure relates to a multi-linkage hinge assembly for moving a seat cushion between upright and flat positions.

BACKGROUND

Typical watercraft may include a variety of seating arrangements of passengers in the watercraft. While many passengers may be seated throughout a watercraft, it is often difficult to seat a passenger such that the passenger is in a rear-facing position. For example, watercraft used for watersports such as wakeboarding and wake surfing include a bench-type seat along at least a passenger side of the watercraft. However, passengers seated along the bench surface may have difficulty in comfortably facing a rearward direction from the watercraft, such as to observe a person engaged in an activity behind the watercraft, and the bench is not typically convertible to support a user in a rear-facing position.

Attempts have been made to provide for convertible rear-facing seats within a watercraft. However, many rear-facing seating configurations reduce a number of seats available for passengers on the watercraft, and further reduce an amount of storage typically available under seats on the watercraft. Other attempts have required complicated mechanisms that require large amounts of space under the seat or are not sufficiently robust to withstand a weight of a user in combination with chop or other rough surface conditions encountered by the watercraft. Similar attempts are also cumbersome, and require movement of several cushion sections and other components to convert a bench-type seat to a support for a user in a rear-facing position.

What is needed, therefore, is a multi-linkage marine seat hinge for converting a cushion of a bench-type seat to a backrest for supporting a user in a rear-facing position on a watercraft.

SUMMARY

The above and other needs are met by a multi-linkage hinge assembly for moving a seat cushion between upright and flat positions. In a first aspect, a multi-linkage hinge assembly is provided for pivoting a seat cushion from a flat position to an upright backrest position, the hinge assembly including: a base bracket; a seat bracket including a first end, a second end, and a support surface for attaching a seat cushion to the seat bracket; a front linkage member having a first end and a second end, the front linkage member pivotally attached at the first end to the first end of the seat bracket and pivotally attached to the base bracket between the first end and the second end; a rear linkage assembly connecting the seat bracket to the base bracket, the rear linkage assembly including: a lower linkage member having a first end and a second end, the lower linkage member pivotally attached to the base bracket at the first end of the lower linkage member, and an upper linkage member pivotally attached at a first end to the second end of the lower linkage member and pivotally attached at a second end to the seat bracket; a tie linkage member connecting the front linkage member to the rear linkage assembly, the tie linkage member pivotally attached at a first end to the lower linkage member and at a second end to the front linkage member.

The tie linkage synchronizes movement of the front linkage and rear linkage assembly when the hinge is operated to move between an upright and flat position.

In one embodiment, the second end of the tie linkage is attached to a lobe formed on the second end of the front linkage. In another embodiment, the first end of the tie linkage member is attached at a midpoint of the lower linkage member of the rear linkage assembly.

In yet another embodiment, the multi-linkage hinge assembly further includes a hinge stop formed in the seat bracket for preventing the hinge from pivoting beyond a desired angle when the hinge is in the upright position. In one embodiment, the hinge stop includes a tab formed in the seat bracket and a projection formed in the upper linkage member, wherein the projection in the upper linkage member contacts the tab of the seat bracket when the hinge is in the upright position.

In one embodiment, the multi-linkage hinge assembly further includes a seat cushion attached to the seat bracket.

In another embodiment, when the hinge is in the upright backrest position, an angle between an axis along a length of the lower linkage member and an axis along a length of the upper linkage member is less than 180°.

In another embodiment, the base bracket is attached to a bench frame.

In one embodiment, the multi-linkage hinge assembly further includes: a first flat cushion positioned on the bench frame adjacent to the base bracket, wherein when the multi-linkage hinge assembly is in the flat position, a front edge of the seat cushion abuts an edge of the first flat cushion such that an upper surface of the seat cushion is aligned with an upper surface of the first flat cushion, and wherein when the hinge assembly is in the upright position, a bottom portion of the seat cushion is adjacent an edge of the first flat cushion such that the seat cushion is configured to support a back of a user seated on the first flat cushion.

In another embodiment, the multi-linkage hinge assembly further includes a second flat cushion positioned on the bench frame adjacent the base bracket wherein when the multi-linkage hinge is in the flat position, a back edge of the seat cushion abuts an edge of the second flat cushion such that an upper surface of the seat cushion is aligned with an upper surface of the second flat cushion.

In a second aspect, a multi-linkage hinge assembly is provided for pivoting a seat cushion from a flat position to an upright backrest position, the hinge assembly including a pair of parallel hinges. Each of the hinges includes: a base bracket; a seat bracket including a first end, a second end, and a support surface for attaching a seat cushion to the seat bracket; a front linkage member having a first end and a second end, the front linkage member pivotally attached at the first end to the first end of the seat bracket and pivotally attached to the base bracket between the first end and the second end; a rear linkage assembly connecting the seat bracket to the base bracket, the rear linkage assembly including: a lower linkage member having a first end and a second end, the lower linkage member pivotally attached to the base bracket at the first end of the lower linkage member, and an upper linkage member pivotally attached at a first end to the second end of the lower linkage member and pivotally attached at a second end to the seat bracket; a tie linkage member connecting the front linkage member to the rear linkage assembly, the tie linkage member pivotally attached at a first end to the lower linkage member and at a second end to the front linkage member; wherein the tie linkage synchronizes movement of the front linkage and rear linkage assembly when the hinge is operated to move between an upright and flat position.

In one embodiment, the multi-linkage hinge assembly further includes a cross-bar extending from a rear linkage assembly of one of the parallel hinges to a rear linkage assembly of the other parallel hinge.

In another embodiment, the cross-bar is attached at a first end to one of the pair of parallel hinges and at a second end to the other of the pair of parallel hinges. In yet another embodiment, the multi-linkage hinge assembly further includes a handle cutout formed in the cross-bar.

In a third aspect, a multi-linkage hinge assembly is provided for pivoting a seat cushion from a flat position to an upright backrest position, the hinge assembly including: a base bracket; a seat bracket including a first end, a second end, and a support surface for attaching a seat cushion to the seat bracket; a front linkage member having a first end and a second end, the front linkage member pivotally attached at the first end to the first end of the seat bracket and pivotally attached to the base bracket between the first end and the second end; a rear linkage assembly connecting the seat bracket to the base bracket, the rear linkage assembly including: a lower linkage member having a first end and a second end, the lower linkage member pivotally attached to the base bracket at the first end of the lower linkage member, and an upper linkage member pivotally attached at a first end to the second end of the lower linkage member and pivotally attached at a second end to the seat bracket; a tie linkage member connecting the front linkage member to the rear linkage assembly, the tie linkage member pivotally attached at a first end to the lower linkage member and at a second end to the front linkage member; and a cross-bar attached at a first end to one of the pair of parallel hinges and at a second end to the other of the pair of parallel hinges; wherein the tie linkage synchronizes movement of the front linkage and rear linkage assembly when the hinge is operated to move between an upright and flat position.

In one embodiment, the multi-linkage hinge assembly further includes a handle cutout formed in the cross-bar.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
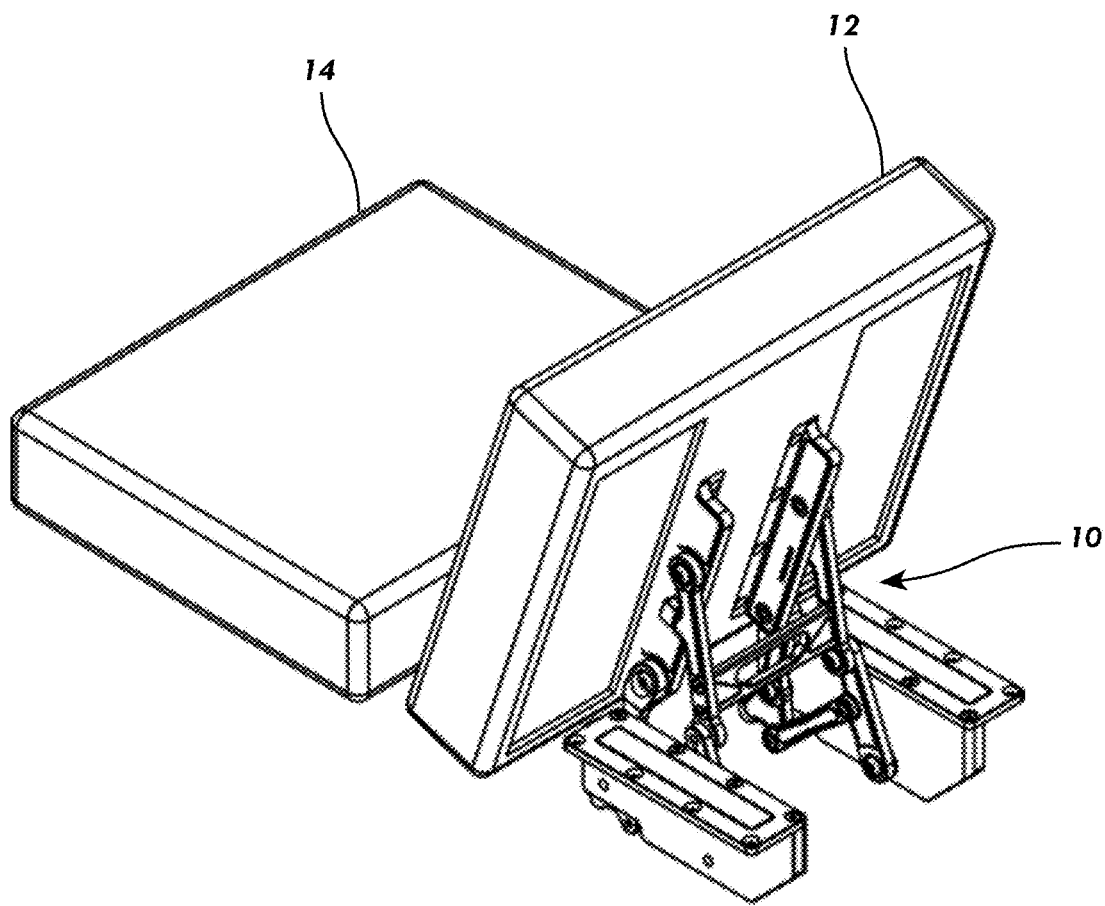
FIG. 1 illustrates a perspective view of a hinge assembly and seat cushion in an upright position according to one embodiment of the present disclosure.
Figure 2:
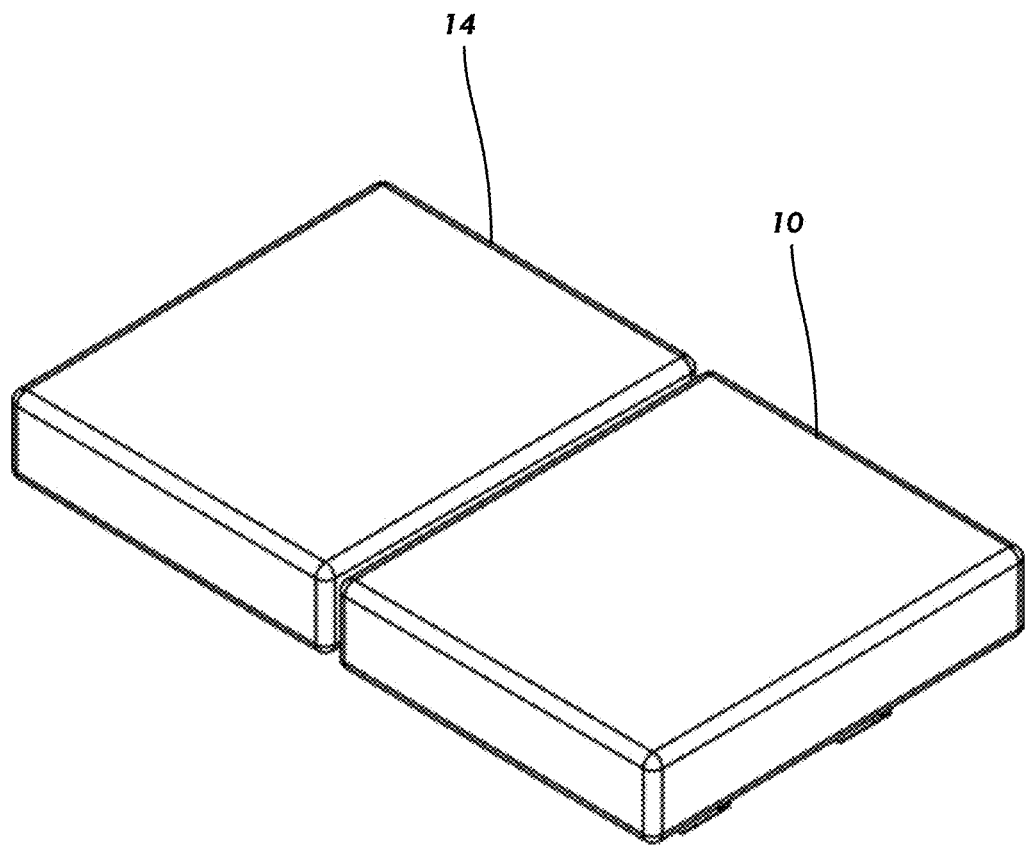
FIG. 2 illustrates a perspective view of a hinge assembly and seat cushion in a flat position according to one embodiment of the present disclosure.

A multi-linkage hinge assembly is provided for moving a seat cushion between an upright backrest position and a flat cushion position. FIG. 1 shows a basic embodiment of a multi-linkage hinge assembly 10. A seat cushion 12 is attached to the hinge assembly 10 and is pivoted between the upright backrest position (FIG. 1) and a flat seat cushion position (FIG. 2). A first flat cushion 14 is positioned adjacent the seat cushion 12. When the seat cushion 12 is in the flat position illustrated in FIG. 2, a top of the seat cushion 12 is aligned with a top of the first flat cushion to form a bench-type seat. When the seat cushion 12 is in the upright position shown in FIG. 1, the seat cushion 12 is configured as a backrest for a user seated on the first flat cushion 14.

Figure 3:
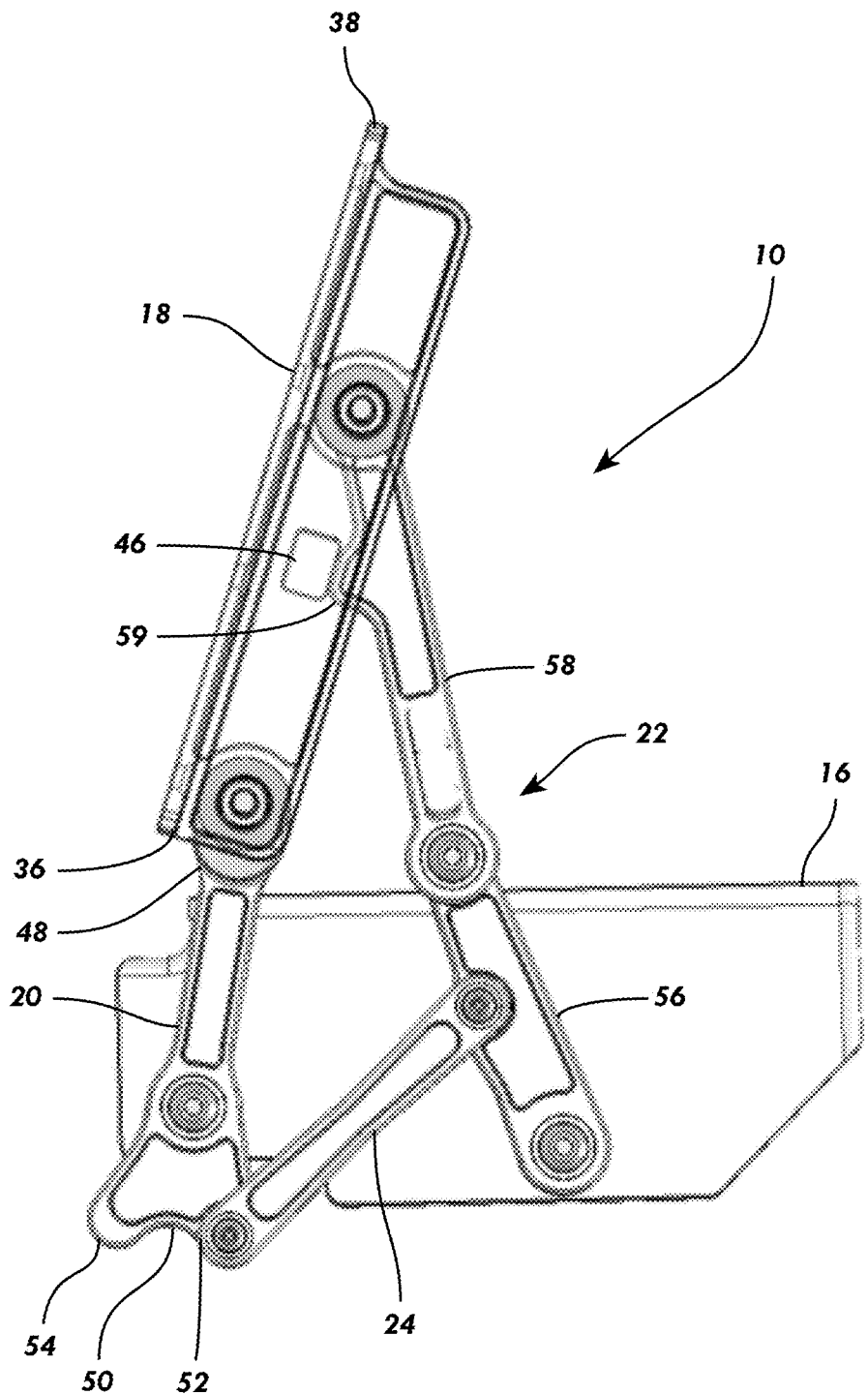
FIG. 3 shows a side view of a hinge assembly according to one embodiment of the present disclosure.

Referring now to FIG. 3, the multi-linkage hinge assembly 10 includes a base bracket 16 and a seat bracket 18. The seat bracket 18 is supported above the base bracket 16 by a front linkage member 20 and a rear linkage assembly 22. The front linkage member 20 and rear linkage assembly 22 are connected by a tie linkage member 24 attached at either end to the front linkage 20 and rear linkage assembly 22 to coordinate movement of the front linkage 20 and rear linkage assembly 22 during movement of the hinge 10.

Figure 4:
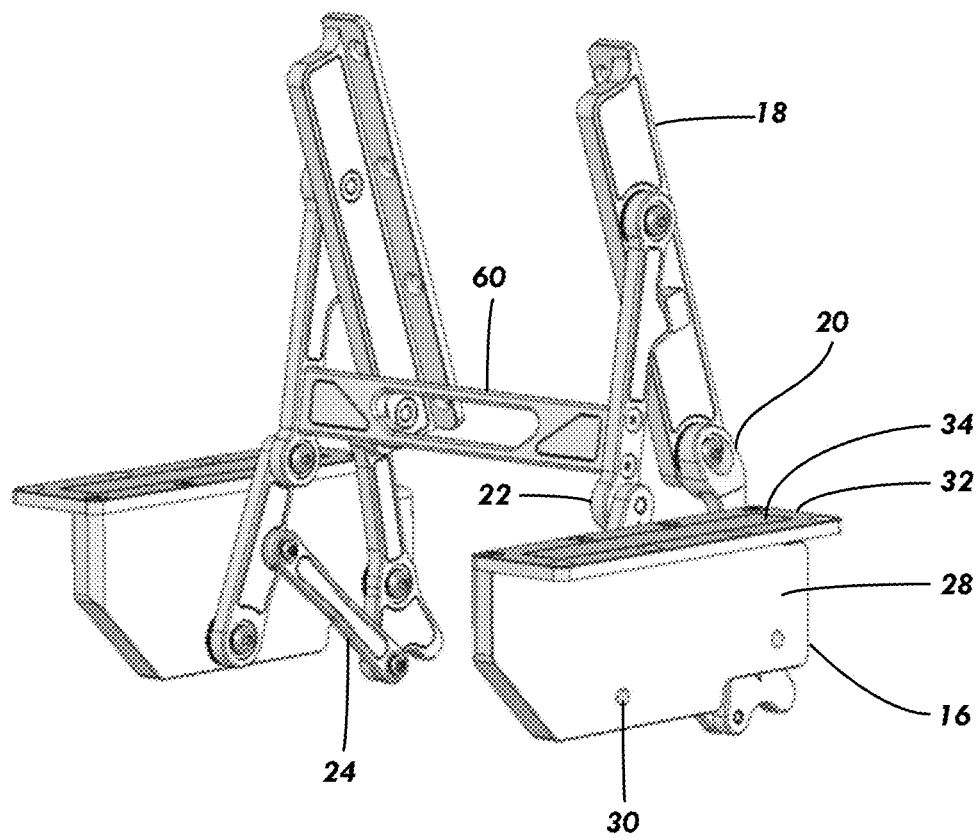
FIG. 4 shows a perspective rear view of a hinge assembly according to one embodiment of the present disclosure.
Figure 8:
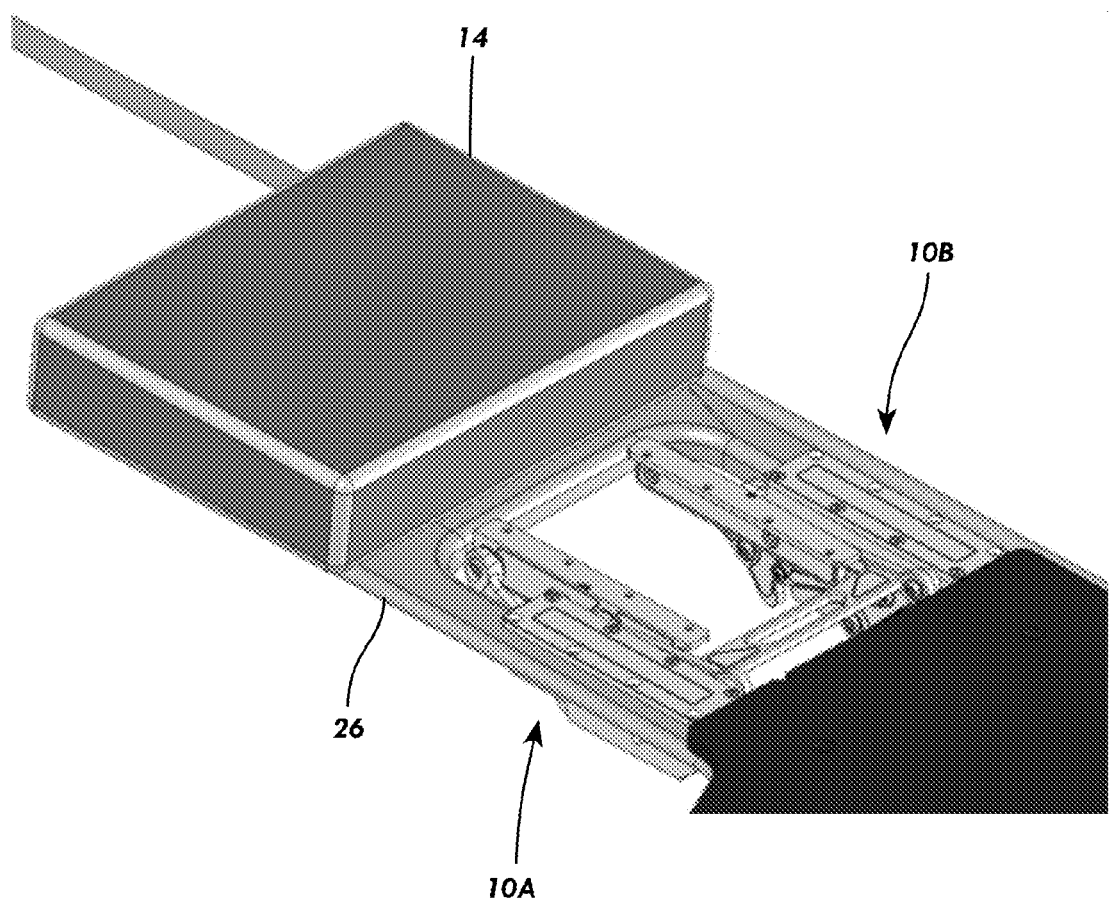
FIG. 8 shows a perspective top view of a hinge assembly, seat cushion, and seat frame according to one embodiment of the present disclosure.

The base bracket 16 is configured to attach the multi-linkage hinge assembly 10 to a seat frame 26 (FIG. 8). As shown in FIG. 4, the base bracket 16 is substantially L-shaped and includes a vertical portion 28 having one or more bores 30 formed therethrough for receiving one or more fasteners for securing the front linkage member 20 and rear linkage assembly 22 to the base bracket 16. The base bracket 16 further includes a horizontal portion 32 having a substantially flat surface 34 arrange to extend over at least a portion of the seat frame 26. The base bracket 16 is attached to the seat frame 26 using one or more fasteners inserted through the flat surface 34 and into the seat frame 26. The horizontal portion 32 may be formed separate from the vertical portion 28 and attached to the vertical portion 28 using one or more fasteners. Alternatively, the horizontal portion 32 and vertical portion 28 may be formed of a single piece. While the above describes a separate base bracket 16 configured to be attached to the seat frame 26, it is also understood that all or portions of the base bracket 16 may be integrally formed in the seat frame 26.

Figure 5:
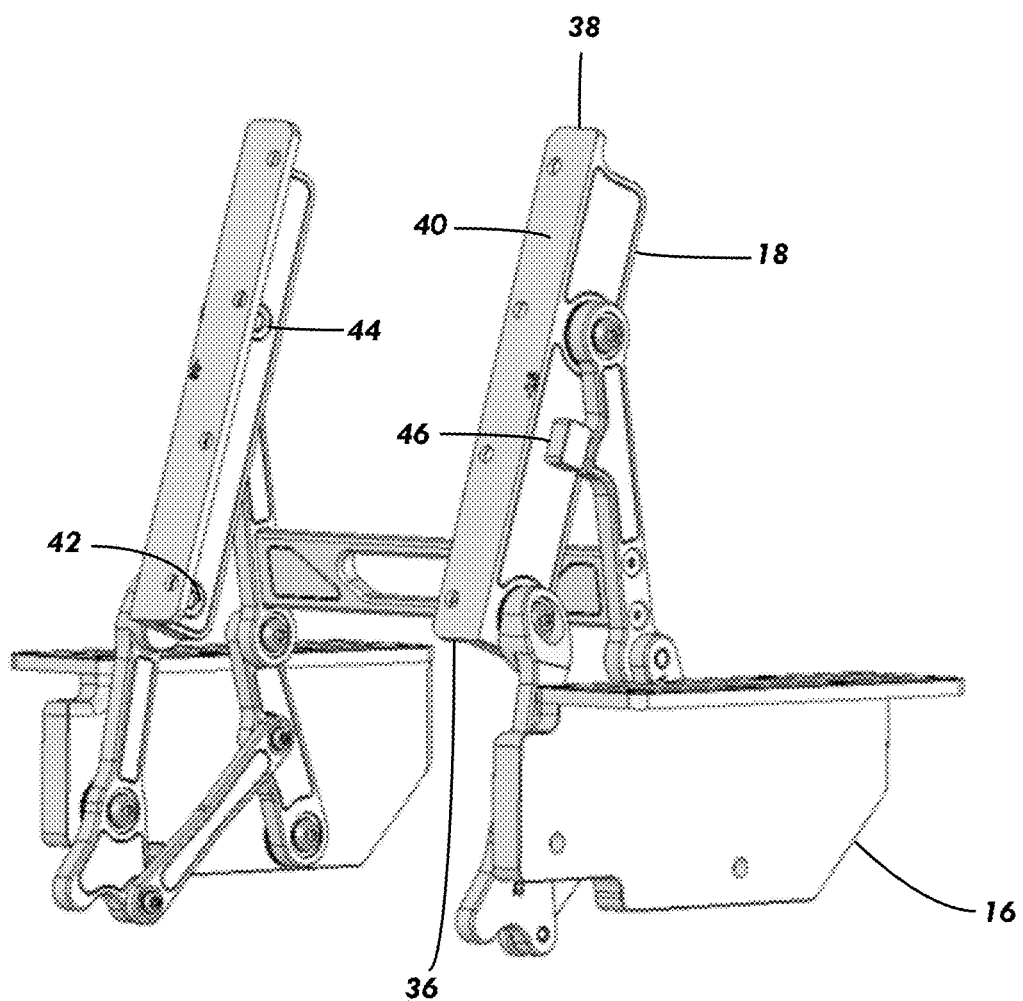
FIG. 5 shows a perspective front view of a hinge assembly according to one embodiment of the present disclosure.

Referring to FIG. 5, the seat bracket 18 is formed in an elongate L-shaped bracket and includes a first end 36 and a second end 38 that is distal from the first end 36. The seat bracket 18 includes a support surface 40 formed along a length of the seat bracket 18. The support surface 40 forms a surface area for contacting the seat cushion 12 and includes one or more bores formed therethrough for receiving one or more fasteners, the one or more fasteners extending through the bores and into a back of the seat cushion 12 to secure the seat cushion to the support surface 40 of the seat bracket 18. The seat bracket 18 may include a first pivot bore 42 formed adjacent the first end 36 of the seat bracket and a second pivot bore 44 formed between the first pivot bore 42 and the second end 38 of the seat bracket 18. A stop tab 46 is extends from a side of the seat bracket 18 between the first pivot bore 42 and the second pivot bore 44. In FIG. 3, the seat bracket 18 is shown as transparent to better illustrate the stop tab 46.

Referring again to FIG. 3, the front linkage member 20 is formed of an elongate body including a first linkage end 48 and a second linkage end 50 distal from the first linkage end 48. The first linkage end 48 of the front linkage member is pivotally attached to the first end 36 of the seat bracket 18. At least a first lobe 52 is formed on the second linkage end 50 of the front linkage member 20. In one embodiment, the second linkage end 50 includes a second lobe 54, with the first lobe 52 and second lobe 54 being substantially off-set from a centerline aligned with a length of the front linkage member 20. The front linkage member 20 is pivotally attached to the base bracket 16 at a point between the first linkage end 48 of the front linkage member 20 and the at least one lobe 52 formed in the second linkage end 50 of the front linkage member 20. The at least first lobe 52 is preferably formed on a side of the pivot connection of the front linkage member 20 to the base bracket 16 that is opposite the pivot connection of the front linkage member 20 to the seat bracket 18.

The rear linkage assembly 22 connects the second pivot bore 44 (FIG. 5) of the seat bracket 18 to the base bracket 16. Rear linkage assembly 22 includes both a lower linkage member 56 and an upper linkage member 58 that are pivotally attached to one another and are configured to substantially collapse as the hinge assembly 10 moves from the upright position to the flat position, as discussed in greater detail below.

The lower linkage member 56 is pivotally attached at a first end to the base bracket 16 and at a second end to the upper linkage member 58. The upper linkage member 58 extends to and is pivotally attached to second pivot bore 44 of the seat bracket 18. The upper linkage member includes a projection 59 formed on a surface of the linkage member that is configured to contact the stop tab 46 of the seat bracket 18 as described in greater detail below.

With further reference to FIG. 3, the tie linkage member 24 is formed of an elongate body that is pivotally attached at one end to the lower linkage member 56 and at another end to the first lobe 52 of the front linkage member 20. The tie linkage member 24 is pivotally attached to the lower linkage member 56 preferably adjacent a mid-point of the lower linkage member 56. While the above description and accompanying figures illustrate one configuration of the tie linkage member 24, it is also understood that the tie linkage member 24 may be attached between the front linkage member 20 and rear linkage assembly 22 such that the tie linkage member 24 coordinates movement of both the front linkage member 20 and rear linkage assembly 22. For example, the tie linkage member 24 may be attached to a mid-point of the front linkage member 20 at one end and to a lower end of the lower linkage member 56. In another alternative, the tie linkage member 24 may be attached to the front linkage member 24 and to the upper linkage member 58. In these configurations, the tie linkage member 24 coordinates counter-rotation of the front linkage member 20 and rear linkage assembly 22.

The elements described above that are pivotally attached to one another may be attached using one or more of a bearing, bushing, fastener, or other similar component to allow the components to pivot with respect to one another. For example, a suitable pivotal attachment may include a sealed bearing inserted into one or more of the pivot bores, and a fastener may extend into or through a center of the sealed bearing such that the elements are secured to one another but allowed to rotate with respect to each other.

Figure 6:
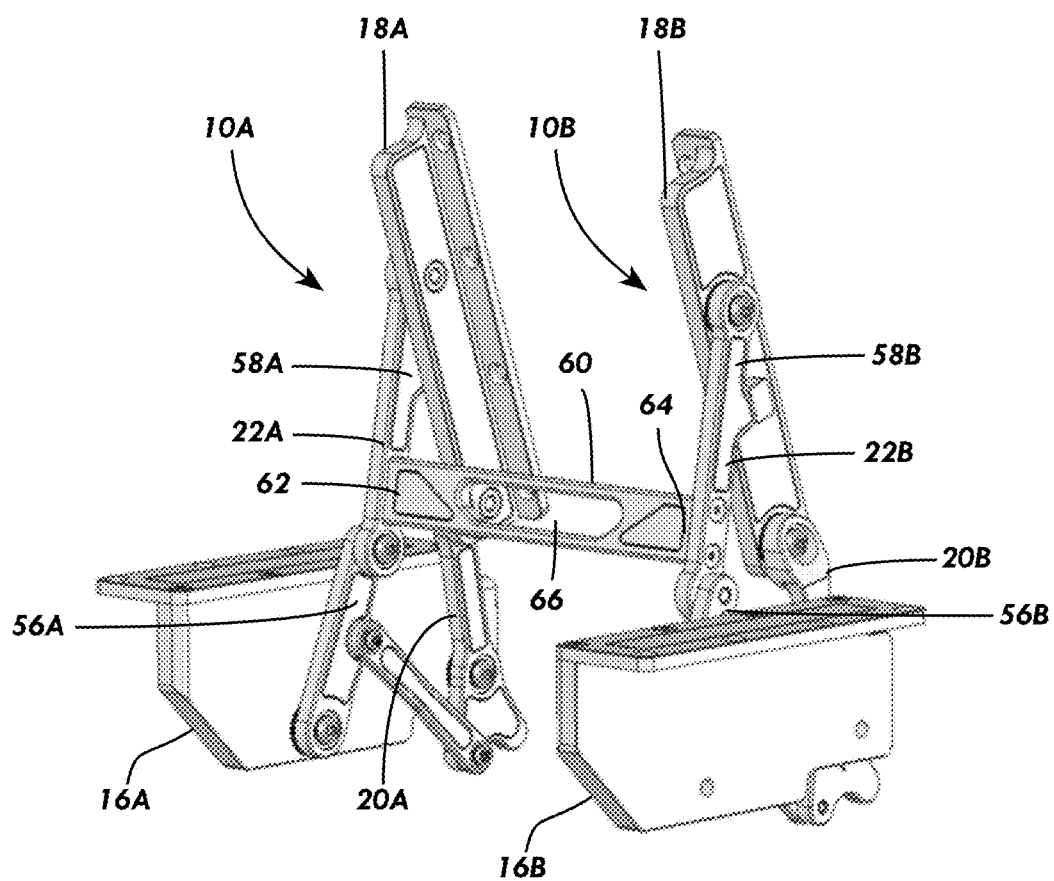
FIG. 6 shows a perspective rear view of a pair of hinge assemblies according to one embodiment of the present disclosure.

Referring now to FIG. 6, a pair of multi-linkage hinge assemblies 10A and 10B is preferably provided, with each of the multi-linkage hinge assemblies including base brackets 16A and 16B, seat brackets 18A and 18B, front linkage members 20A and 20B, and rear linkage assemblies 22A and 22B. Each of the hinge assemblies 10A and 10B are preferably formed as described above such that the brackets hinge from an upright position to a flat position.

A cross-bar 60 is attached at a first end 62 to the rear linkage assembly 22A of the first hinge 10A and at a second end 64 to the rear linkage assembly 22B of the second hinge 10B. The cross-bar 60 is preferably attached to each of the rear linkage assemblies 22A and 22B at a lower end of the upper linkage members 58A and 58B adjacent to a point at which the upper linkage members 58A and 58B are pivotally attached to the lower linkage members 56A and 56B. The cross-bar 60 may be attached to the lower linkage members 56A and 56B using, for example, one or more fasteners inserted through the lower linkage members 56A and 56B and threadably inserted into the cross-bar.

The cross-bar 60 includes an elongate cut-out 66 formed along a length of the cross-bar 60. The cut-out 66 is formed to receive a hand of a user and configured to operate as a handle to allow a user to pull the cross-bar 60 when the hinge assemblies 10A and 10B are in the upright position.

Each of the linkage members and brackets are preferably formed of a metal, such as steel or aluminum, and may be formed by one of stamping, machining, or other processes suitable to form each linkage. Alternatively, some or all of the linkage members and brackets may be formed of other suitable materials, such as a lightweight polymer or composite material.

Figure 7:
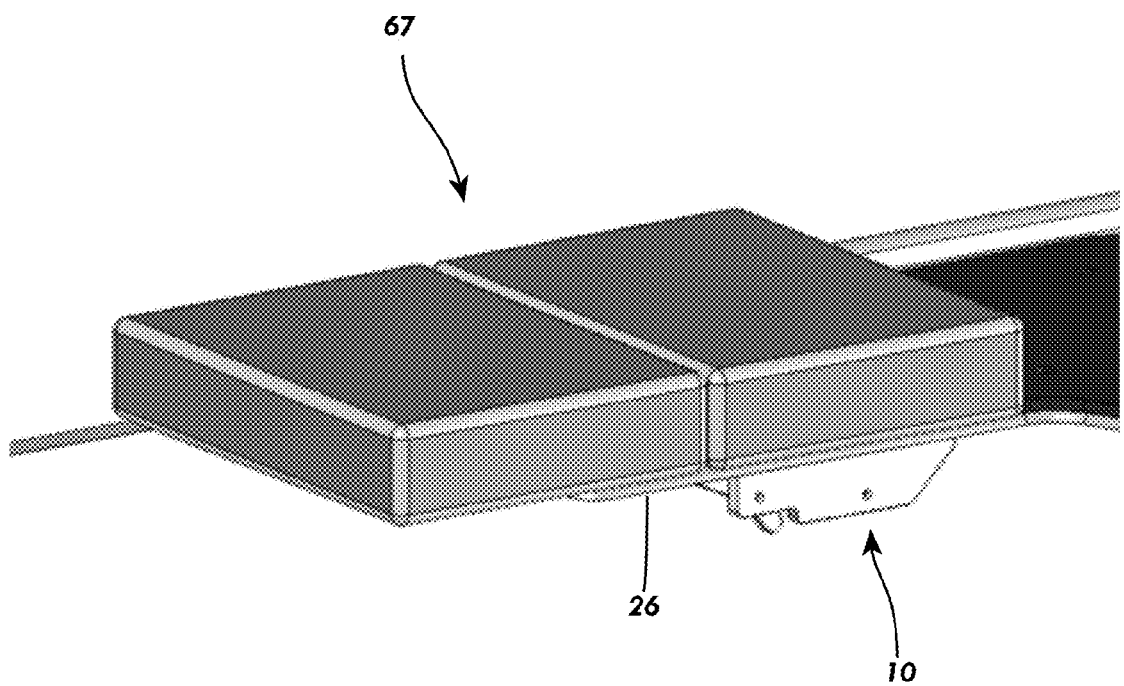
FIG. 7 shows a perspective side view of a hinge assembly and seat frame according to one embodiment of the present disclosure.

The pair of multi-linkage hinges are preferably installed in a watercraft, such as a watercraft configured to tow a user behind the watercraft for water activities such as wakeboarding or wake surfing. The multi-linkage hinges are attached to the seat frame 26 that is configured run along a length of a side of the boat to substantially form a center-facing bench seat 67 (FIG. 7). The multi-linkage hinges 10A and 10B may be installed along sides of the seat frame 26 adjacent to the first flat cushion 14 that may be resting on the seat frame 26, as shown in FIG. 8.

In operation, the hinges 10A and 10B are configured to move the seat cushion 12 between a flat position, in which a top of the seat cushion 12 is aligned with a top of the adjacent flat cushion 14, to an upright position, in which the seat cushion 12 is held in an upright position to support a back of a user seated on the flat cushion 14. When a user is seated on the flat cushion 14 with the user's back supported by the upright seat cushion 12, the user is comfortably positioned in a rearward facing direction to view activities occurring behind the watercraft.

Figure 9:
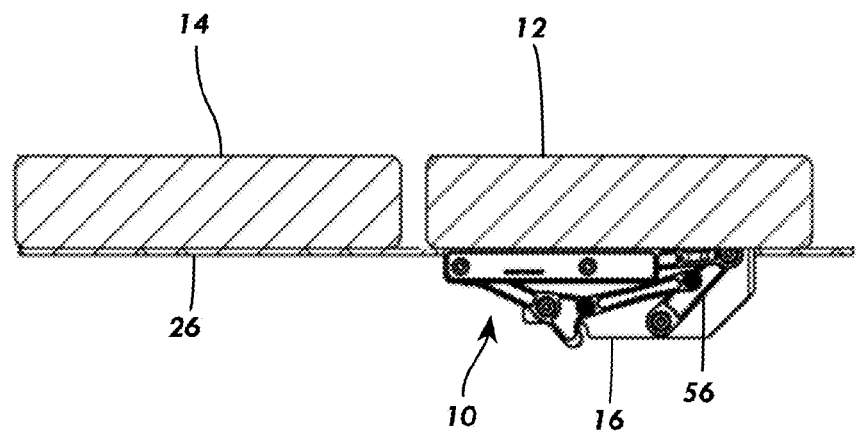
FIGS. 9-11 illustrates a side view of a hinge and seat cushion moving between an upright and flat position.

FIG. 9 shows a side view of the hinge assembly 10 in the flat position, in which the seat bracket 18 is parallel to the seat frame 26, and the upper linkage member 58 is folded relative to the lower linkage member 56. Further, when the hinge assembly 10 is in the flat position, linkages of the hinge assembly 10 do not extend greatly below a bottom edge of the base bracket 16 such that any space below the seat cushion 12 and linkage assembly 10 may be suitable for storage. A weight of the seat cushion 12 and friction of the linkage pivots maintains the seat cushion 12 in the flat position.

Figure 10:
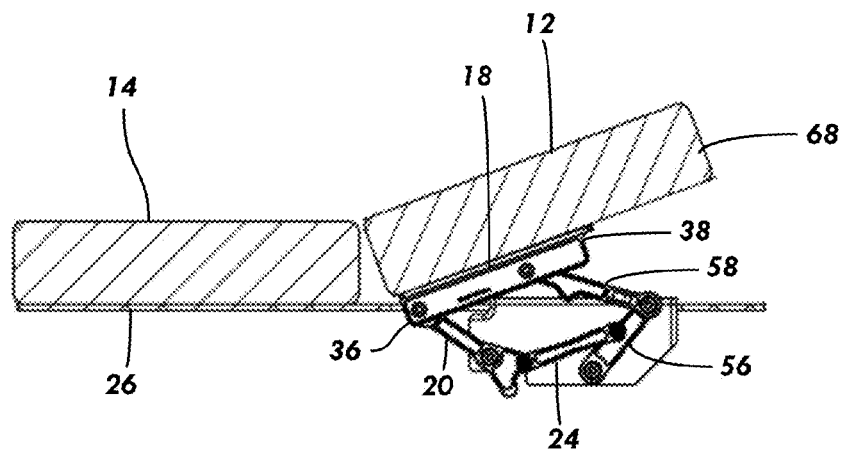

When a user desires to move the seat cushion 12 into an upright position, an edge 68 of the seat cushion 12 may be grasped by the user and pulled in an upward direction. FIG. 10 illustrates the seat cushion 12 in a partially upright position between the flat position and upright position. As the hinge assembly 10 moves from the flat position, the second end 38 of the seat bracket 18 begins to rise relative to the first end 36 of the seat bracket 18. As the edge 68 of the seat cushion 12 is urged upwards, the upper linkage member 58 and lower linkage member 56 begin to unfold. The lower linkage member 56 rotates in a counter-clockwise direction relative to the view of FIG. 10 as the lower linkage member is pulled in an upward direction.

When the lower linkage member 56 rotates in a counter-clockwise direction, the tie linkage 24 pushes the lobe 52 of the front linkage member 20 such that the front linkage member rotates in a clockwise direction relative to the view of FIG. 10. As the front linkage member 20 begins to rotate, the first end 36 of the seat bracket 18 is pulled away from the adjacent flat cushion 14.

Figure 11:
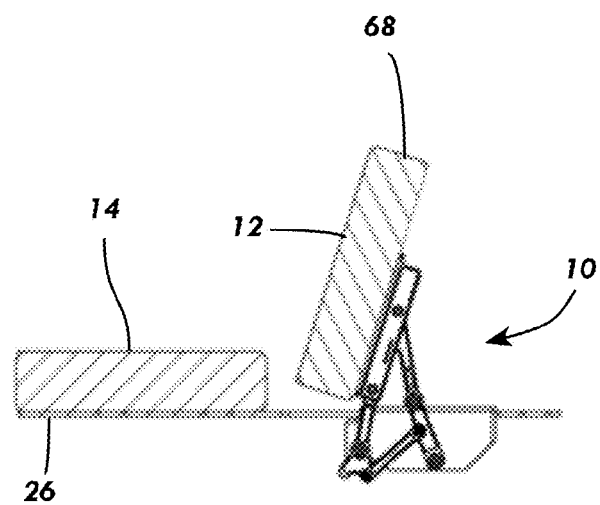

Referring now to FIG. 11, the seat cushion 12 is urged upwards until the seat cushion 12 is in the upright position. Upon reaching the upright position, the projection 59 of the upper linkage member 56 contacts the stop tab 46 of the seat bracket 18 to prevent the hinge 10 from moving beyond the upright position. When the hinge 10 is in the upright position, an angle between an axis extending along a length of the lower linkage member 56 and an axis extending along a length of the upper linkage member 58 is less than 180° such that the rear linkage assembly 22 is angled towards the front linkage member 20. In this position, with the upper linkage projection 59 contacting the stop tab 46 and the angle between the upper linkage member 56 and lower linkage member 58 being less than 180°, the hinge assembly 10 is substantially locked such that when a weight of a user is leaned against the upright seat cushion 12 the hinge assembly 10 will not allow the seat cushion 12 to collapse to the flat position.

When a user desires to return the seat cushion 12 to the flat position illustrated in FIG. 2, the user first grasps the cut-out 66 formed in the cross-bar 60 to initially pull the upper linkage member 58 and attached lower linkage member 56 and unlock the hinge assembly 10. After initially unlocking the hinge assembly 10, the user may urge the seat cushion edge 68 downward, thereby returning the seat cushion 12 to the flat position. As the hinge assembly 10 returns to the flat position, the front linkage 20 urges the first seat bracket end 36 towards the flat cushion 14 such that when the hinge assembly 10 is fully collapsed and is in the flat position, any gap between the seat cushion 12 and flat cushion 14 is minimized. When the seat cushion 12 is returned to the flat position, the seat cushion 12 is supported by the base bracket 16 or seat frame 26 such that the seat cushion 12 is capable of supporting a weight of the user when in the flat position.

The multi-linkage hinge assembly 10 of the present disclosure advantageously provides a strong and simple mechanism for moving the seat cushion between the flat and upright positions. The hinge assembly 10 allows the seat cushion to quickly move to the upright position and remain locked in that position without requiring additional complex mechanisms such as a ratchet or other device to lock the hinge in the upright position. The tie linkage, cross-bar, and other components of the hinge synchronize movement of linkage members of the hinge to prevent binding of the hinge during movement. Further, the hinge is relatively low profile such that any storage space beneath the hinge assembly and seat cushion is not substantially compromised by use of the seat cushion. Finally, the hinge assembly 10 repositions an edge of the seat cushion away from the adjacent flat cushion as the cushion moves from the flat to upright position and towards the adjacent flat cushion when moving from the upright to flat position. This movement of the seat cushion prevents interference between the seat cushion and adjacent flat cushion and also ensures that any gap between the two cushions in the flat position is substantially minimized. This allows for thicker cushions to be used without compromising operation of the hinge assembly. While the above contemplates use of the hinge assembly in a marine environment, such as on a watercraft, it is also understood that the hinge assembly may be implemented in a number of other applications, such as on a deck chair or other bench on which it may be desirable to move a seat cushion between upright and flat positions.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A multi-linkage hinge assembly for pivoting a seat cushion from a flat position to an upright backrest position, the hinge assembly comprising:
   a base bracket;
   a seat bracket including a first end, a second end, and a support surface for attaching a seat cushion to the seat bracket;
   a front linkage member having a first end and a second end, the front linkage member pivotally attached at the first end to the first end of the seat bracket and pivotally attached to the base bracket;
   a rear linkage assembly connecting the seat bracket to the base bracket, the rear linkage assembly including:
      a lower linkage member having a first end and a second end, the lower linkage member pivotally attached to the base bracket at the first end of the lower linkage member, and
      an upper linkage member pivotally attached at a first end to the second end of the lower linkage member and pivotally attached at a second end to the seat bracket;
   a tie linkage member connecting the front linkage member to the rear linkage assembly, the tie linkage member pivotally attached at a first end to the lower linkage member and at a second end to the front linkage member of the rear linkage assembly;
   wherein movement of the rear linkage assembly induces movement of the front linkage member via the tie linkage member attached to the front linkage member and rear linkage assembly; and wherein movement of the front linkage member induces movement of the rear linkage assembly via the tie linkage member attached to the front linkage member and rear linkage assembly.

2. The multi-linkage hinge assembly of claim 1, wherein the second end of the tie linkage is attached at a first end to a lobe formed on the second end of the front linkage.

3. The multi-linkage hinge assembly of claim 2, wherein the first end of the tie linkage member is attached at a second end at a midpoint of the lower linkage member of the rear linkage assembly.

4. The multi-linkage hinge assembly of claim 1, wherein the first end of the tie linkage assembly is attached at a midpoint of the front linkage and at lower portion of the lower linkage member.

5. The multi-linkage hinge assembly of claim 1, wherein the second end of the tie linkage is attached to the upper linkage member.

6. The multi-linkage hinge assembly of claim 1, wherein the front linkage member is pivotally attached to the to the base bracket between the first end and the second end of the base bracket.

7. The multi-linkage hinge assembly of claim 1 further comprising a hinge stop formed in the seat bracket for preventing the hinge from pivoting beyond a desired angle when the hinge is in the upright position.

8. The multi-linkage hinge assembly of claim 7, wherein the hinge stop comprises a tab formed in the seat bracket and a projection formed in the upper linkage member, wherein the projection in the upper linkage member contacts the tab of the seat bracket when the hinge is in the upright position.

9. The multi-linkage hinge assembly of claim 1, further comprising a seat cushion attached to the seat bracket.

10. The multi-linkage hinge assembly of claim 9, wherein the base bracket is attached to a bench frame.

11. The multi-linkage hinge assembly of claim 10, further comprising:
a first flat cushion positioned on the bench frame adjacent to the base bracket,
wherein when the multi-linkage hinge assembly is in the flat position, a front edge of the seat cushion abuts an edge of the first flat cushion such that an upper surface of the seat cushion is aligned with an upper surface of the first flat cushion, and
wherein when the hinge assembly is in the upright position, a bottom portion of the seat cushion is adjacent an edge of the first flat cushion such that the seat cushion is configured to support a back of a user seated on the first flat cushion.

12. The multi-linkage hinge assembly of claim 11, further comprising a second flat cushion positioned on the bench frame adjacent the base bracket wherein when the multi-linkage hinge is in the flat position, a back edge of the seat cushion abuts an edge of the second flat cushion such that an upper surface of the seat cushion is aligned with an upper surface of the second flat cushion.

13. The multi-linkage hinge assembly of claim 1, wherein when the hinge is in the upright backrest position, an angle between an axis along a length of the lower linkage member and an axis along a length of the upper linkage member is less than 180°.

14. A multi-linkage hinge assembly for pivoting a seat cushion from a flat position to an upright backrest position, the hinge assembly comprising:
a pair of parallel hinges, each of the hinges including:
a base bracket;
a seat bracket including a first end, a second end, and a support surface for attaching a seat cushion to the seat bracket;
a front linkage member having a first end and a second end, the front linkage member pivotally attached at the first end to the first end of the seat bracket and pivotally attached to the base bracket between the first end and the second end;
a rear linkage assembly connecting the seat bracket to the base bracket, the rear linkage assembly including:
a lower linkage member having a first end and a second end, the lower linkage member pivotally attached to the base bracket at the first end of the lower linkage member, and
an upper linkage member pivotally attached at a first end to the second end of the lower linkage member and pivotally attached at a second end to the seat bracket;
a tie linkage member connecting the front linkage member to the rear linkage assembly, the tie linkage member pivotally attached at a first end to the lower linkage member and at a second end to the front linkage member;
wherein movement of the rear linkage assembly induces movement of the front linkage member via the tie linkage member attached to the front linkage member and rear linkage assembly; and
wherein movement of the front linkage member induces movement of the rear linkage assembly via the tie linkage member attached to the front linkage member and rear linkage assembly.

15. The multi-linkage hinge assembly of claim 14, further comprising a cross-bar extending from a rear linkage assembly of one of the parallel hinges to a rear linkage assembly of the other parallel hinge.

16. The multi-linkage hinge assembly of claim 15, wherein the cross-bar is attached at at first end to one of the pair of parallel hinges and at a second end to the other of the pair of parallel hinges.

17. The multi-linkage hinge assembly of claim 15, further comprising a handle cutout formed in the cross-bar.

18. A multi-linkage hinge assembly for pivoting a seat cushion from a flat position to an upright backrest position, the hinge assembly comprising:
a base bracket;
a seat bracket including a first end, a second end, and a support surface for attaching a seat cushion to the seat bracket;
a front linkage member having a first end and a second end, the front linkage member pivotally attached at the first end to the first end of the seat bracket and pivotally attached to the base bracket between the first end and the second end;
a rear linkage assembly connecting the seat bracket to the base bracket, the rear linkage assembly including:
a lower linkage member having a first end and a second end, the lower linkage member pivotally attached to the base bracket at the first end of the lower linkage member, and
an upper linkage member pivotally attached at a first end to the second end of the lower linkage member and pivotally attached at a second end to the seat bracket;
a tie linkage member connecting the front linkage member to the rear linkage assembly, the tie linkage member pivotally attached at a first end to the lower linkage member and at a second end to the front linkage member; and a cross-bar attached at a first end to the upper linkage member of one of the pair of parallel hinges and at a second end to the other of the pair of parallel hinges;

wherein movement of the rear linkage assembly induces movement of the front linkage member via the tie linkage member attached to the front linkage member and rear linkage assembly; and wherein movement of the front linkage member induces movement of the rear linkage assembly via the tie linkage member attached to the front linkage member and rear linkage assembly.

19. The multi-linkage hinge assembly of claim 18, further comprising a handle cutout formed in the cross-bar.

\* \* \* \* \*